Figure 2:
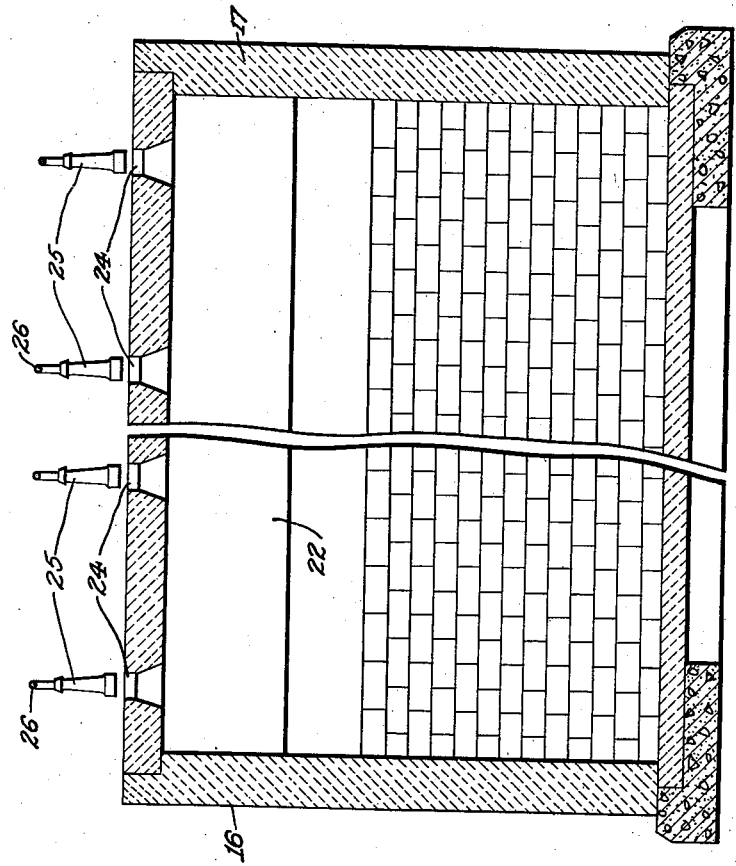

Dec. 23, 1941.   J. H. RICKERMAN   2,267,170
HEATING HYDROCARBON FLUIDS
Filed May 6, 1939

INVENTOR
JOHN HERMAN RICKERMAN
E. F. Liebrecht
ATTORNEY

Patented Dec. 23, 1941

2,267,170

UNITED STATES PATENT OFFICE 2,267,170

HEATING HYDROCARBON FLUIDS

John Herman Rickerman, River Edge, N. J., assignor to Gasoline Products Company, Inc., Jersey City, N. J., a corporation of Delaware Application May 6, 1939, Serial No. 272,213

5 Claims. (Cl. 196—116)

This invention relates to heating apparatus adapted for heating fluids and more particularly for heating hydrocarbon fluids.

According to my invention a heating apparatus is provided which includes a radiant heating chamber or section and a convection heating chamber or section. The radiant heating section is heated by burners or the like associated with the roof of the radiant heating section or chamber for introducing hot products of combustion downwardly into the radiant heating section and for generating radiant heat in the radiant heating section. Conduits for conveying fluids to be heated are provided in the convection heating section or chamber and in the radiant heating section or chamber and these conduits are preferably in communication so that the fluid to be heated passes serially through the conduits.

In the radiant heating chamber the fluid conduits are preferably arranged as a vertical row of horizontally extending tubes adjacent one side wall of the radiant heating section. The opposite side wall of the radiant heating section is preferably provided with a heat radiating wall preferably of stepped formation, the heat radiating wall extending at an angle to the floor and to the side wall of the radiant heating section. The heat radiating wall has at least a portion thereof in the path of the hot products of combustion and burning gases which pass in a downward direction in the radiant heating chamber so as to increase turbulence in the burning gases and further mixing of the air and fuel undergoing combustion. The heat radiating wall becomes heated and reradiates heat to the fluid conduits or tubes in the radiant heating section for heating these tubes in addition to the radiant heat supplied thereto by the hot products of combustion.

The radiant heating section and convection heating section are separated by a depending bridge wall which extends downwardly from the roof of the heating apparatus for a relatively short distance. The bridge wall and convection heating section may be omitted. The lower end of the bridge wall is positioned above the upper portion of the heat radiating wall and is spaced therefrom to form a conduit or passageway whereby the hot products of combustion from the radiant heating section pass to the convection heating section and then to a stack. With this arrangement it will be seen that the fuel undergoing combustion passes downwardly in the radiant heating section and then passes upwardly from the same radiant heating section and leaves the heating apparatus from an upper portion thereof beyond the bridge wall and in this way substantially complete combustion is obtained in the radiant heating section and better heating of the fluid passing through the tubes or conduits is obtained.

Figure 1:
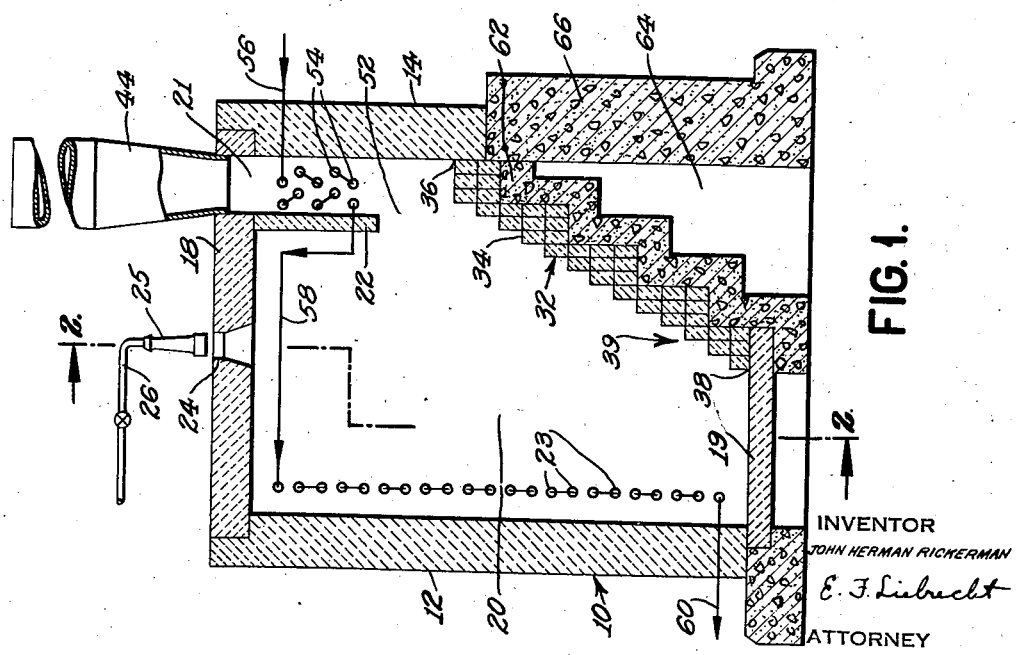

In the drawing,

Fig. 1 represents a vertical transverse section taken through one form of heating apparatus embodying my invention; and Fig. 2 represents a partial longitudinal vertical section taken on line 2—2 of Fig. 1 with parts omitted to facilitate the disclosure.

Referring now to the drawing the reference character 10 designates a heating apparatus which is substantially of a box-like type construction. The heating apparatus includes parallel side walls 12 and 14, parallel end walls 16 and 17, a roof 18 and a floor 19 to provide a radiant heating section 20 and a convection heating section 21 separated by a bridge wall 22 depending for a relatively short distance from the roof 18 as will be hereinafter described in greater detail.

Arranged along the side wall 12 of the radiant heating section 20 is a vertical bank of horizontally extending tubes 23 which are serially connected to conduct fluid to be heated through the radiant heating section 20. If desired the tubes 23 may be vertically arranged and the flow of fluid through the heater tubes may be changed to heat a plurality of streams of fluid. Instead of using a single row of tubes a plurality of rows of tubes may be used, preferably arranged in staggered relation. The tubes 23 in the radiant heating section or chamber 20 are heated mainly by radiant heat which is supplied by hot products of combustion produced by burning fuel in the radiant heating section.

The hot products of combustion may be introduced as such but they are preferably produced by burning a suitable fuel introduced into the radiant heating section or chamber by means of a plurality of burners or the like preferably in alined arrangement. The roof 18 of the heating apparatus or furnace 10 is provided with a series of openings 24. Positioned above each opening is a burner 25 provided with a valved feed line 26 whereby fuel is passed through each burner 25 and its respective opening 24 and air for supporting the combustion is supplied around the lower end of each burner 25. The fuel to be burned is introduced downwardly into the radiant heating section or chamber 20 in a plurality of alined streams substantially centrally of the radiant heating chamber 20. Other burners may be used such as pre-mix burners and such burners may extend through the roof 18 into the radiant heating chamber 20.

The radiant heating section or chamber 20 is provided in a lower corner with an inclined heat radiating wall 32 which is heated by hot combustion gases and which is preferably of a stepped formation 34 to increase the heat radiating surface. The heat radiating wall 32 supported in any suitable manner, is arranged at an angle and extends from an intermediate portion 36 of side wall 14 to an intermediate portion of the floor 19 of the radiant heating section as at 38.

The heat radiating wall 32 is arranged so that the lower portion thereof generally indicated at 39 is in the path of the downwardly moving burning gases and products of combustion. The burning gases and combustion products impinge against the lower portion of the heat radiating wall 32 and the downward movement of the products of combustion and burning gases is changed to effect increased turbulence in the burning gases and better mixing of the air and fuel undergoing combustion. The products of combustion and burning gases are deflected away from the heat radiating wall 32 and convection heating chamber 21 and toward the vertical bank of heater tubes 23 but the flames do not contact the heater tubes 23. The combustion products and burning gases move upwardly and across the radiant heating section 20 and leave the chamber 20 through the convection heating chamber 21, above the upper portion of the heat radiating wall 32 as will be presently described. While one form and arrangement of heat radiating wall 32 has been shown and described, I am not to be limited thereto as other forms may be used.

The relatively short depending bridge wall 22 extends to a point above the upper portion of the heat radiating wall 32 to provide a passageway 52 for the combustion gases leaving the radiant heating section 20. A stack 44 is provided above the convection heating section 21 to conduct products of combustion from the convection heating section 21 and from the furnace.

Horizontally extending conduits or tubes 54 are provided in the convection heating section 21 and are preferably connected to provide serial flow. In one form of the invention, fluid to be heated is passed through line 56, heater tubes 54 in the convection heating section 21, then through line 58 and the vertical bank 23 of heater tubes in the radiant heating section 20 and the heated fluid leaves the radiant heating section through line 60.

One form of support for the heat radiating wall 32 will now be described. The heat radiating wall 32 is preferably constructed from fire-brick and is preferably embedded in a concrete layer or the like 62. The concrete layer 62 may be supported by any suitable filling material 64 or the filling material may be omitted. A supporting wall 66 forms a continuation of side wall 14 and forms a support for side wall 14 and heat radiating wall 32. The side wall 14 and floor 19 are preferably constructed of fire-brick.

The heating apparatus or furnace may be used, for example, for quickly bringing hydrocarbon fluids to a desired temperature or may be used for heating hydrocarbon fluids to conversion temperature. In operating the heating apparatus any suitable fuel is passed through the burners 25, mixed with air and combustion is initiated. The streams of burning fuel or gases are introduced into the radiant heating section 20 from the top thereof. The direction of flow of the burning gases and the hot products of combustion from the burners 25 is downward and opposite to the natural tendency of heated gases to rise and this creates some turbulence and mixing of the fuel and air. It will be noted that the convection heating section 21 is formed from a part of the upper portion of the radiant heating section 20 and, therefore, it is necessary for the direction of flow of the hot products of combustion introduced into the radiant heating chamber 20 by burners 25 to be reversed from downward to upward before the products of combustion can leave the radiant heating section 20 through the convection heating section 21 and to the stack 44. Also some of the burning gases are directed away from the convection heating section and pass upwardly and then across and leave the radiant heating section 20 through the convection heating section 21. In this way increased turbulence in the burning gases is obtained and this results in substantially complete combustion of the fuel within the radiant heating section 20 and radiant heat is provided for heating the tubes or conduits 23 in the radiant heating section 20.

The inclined heat radiating wall 32 has at least a portion directly in the path of the burning fuel or gases and products of combustiton so that it assists in the combustion of the fuel and at the same time becomes heated to incandescence and reradiates heat to the conduits or tubes 23. By having a portion of the inclined heat radiating wall 32 in the path of the downwardly moving streams of fuel undergoing combustion, the streams are deflected from their downward path to create turbulence and obtain substantially complete combustion within the radiant heating section 20. For example, portions of the streams of burning gases will be deflected toward the left in Fig. 1 and it will be necessary for such deflected portions of burning gases to rise and eventually pass across the radiant heating chamber 20 to the right in Fig. 1 in order to pass through the convection heating section 21 and to the stack 44 to be conducted away from the heating apparatus. While the inclined heat radiating wall 32 deflects portions of the downwardly moving streams of hot gases, it does not direct the flames resulting from the combustion of the fuel against or in contact with the tubes or conduits 22 as this might cause overheating of the hydrocarbon fluids passing therethrough. The tubes or conduits 22 are heated mainly by radiant heat from the combustion gases and by reradiated heat from the inclined heat radiating wall 32 but the flames resulting from the burning of the fuel are not contacted with the conduits or tubes 22 and in this way overheating of the hydrocarbon fluid passing through the tubes or conduits 22 is prevented.

As shown in the drawing the fluid to be heated is first passed through the tubes 54 in the convection heating section for preheating the fluids and the preheated fluids are then passed in a general downward direction through the vertical bank of horizontally extending tubes or conduits 23 in the radiant heating section 20. The heated fluids leave the tubes or conduits 23 through line 60 and may be further treated as desired. While one flow of fluid has been shown in the drawing, it is to be understood that other flows of fluid may be used. For example, the direction of flow may be reversed so that fluid to be heated is first passed through heater tubes or conduits 23 and then passed through the tubes or conduits 54 in the convection heating section 21. In addition, if desired roof tubes or floor tubes or both may be added to the radiant heating section 20.

Where a larger furnace is desired, two units as shown in the drawing may be combined in a substantially symmetrical arrangement. In this case the central wall 14 and supporting wall 66 are omitted in each unit and a common overhead convection heating section is provided which receives products of combustion from both radiant heating sections. The heat radiating walls 32 are arranged in back to back relation. The radiant heating sections may be separately fired downwardly and may be maintained at different temperatures so that hydrocarbon fluid passing through heater tubes in one radiant heating section would be rapidly heated to conversion temperature and the heated hydrocarbon fluid would then be passed through heater tubes in the other radiant heating section maintained under more moderate heating conditions to maintain the heated hydrocarbon fluid at a conversion temperature for the desired time. Other flows of hydrocarbon fluid may be used and the heating of the radiant heating sections may be controlled as desired.

While I have shown one form of apparatus for practicing my invention it is to be understood that this is by way of illustration only and various changes and modifications may be made without departing from the spirit of my invention.

I claim:

1. A method of heating hydrocarbon fluids which comprises passing hydrocarbon fluids through heater tubes in a radiant heating chamber provided with an outlet adjacent an upper lateral portion thereof through which the products of combustion leave the radiant heating chamber from an upper point therein, supplying radiant heat to said heater tubes by passing fuel and air downwardly in said radiant heating chamber at a point laterally spaced from said outlet, reversing the direction of flow of the burning gases to increase turbulence thereof and directing at least a portion of the burning gases away from said outlet, and passing the last mentioned gases upwardly in said radiant heating chamber and across said radiant heating chamber toward said outlet.

2. A furnace adapted for heating hydrocarbon fluids comprising a radiant heating chamber formed with side walls, a roof and a floor, means comprising a burner associated with the roof of said radiant heating chamber for burning fuel and supplying hot products of combustion thereto in a downward direction to generate radiant heat in said radiant heating chamber, conduits disposed along a wall of said radiant heating chamber for conveying hyrocarbon fluids to be heated, an inclined wall extending at an angle from an intermediate point of an opposite wall of said radiant heating chamber to the floor thereof, said inclined wall having a portion positioned beneath said burner in the path of the downflowing combustion gases adapted to promote turbulence thereof, a bridge wall extending downwardly from said roof a relatively short distance and spaced from the upper portion of said inclined wall to form a passageway through which hot products of combustion flow into a convection heating section formed by said bridge wall and positioned above said inclined wall, and conduits in said convection heating section in communication with said conduits in said radiant heating chamber.

3. A furnace adapted for heating hydrocarbon fluids comprising a radiant heating chamber formed with side walls, a roof and a floor, means comprising a burner associated with the roof of said radiant heating chamber for burning fuel and supplying hot products of combustion thereto in a downward direction to generate radiant heat in said radiant heating chamber, conduits disposed along a wall of said radiant heating chamber for conveying hyrocarbon fluids to be heated, a stepped heat radiating wall extending at an angle from an intermediate point of an opposite wall of said radiant heating chamber to the floor thereof, said stepped heat radiating wall having a portion positioned beneath said burner in the path of the downflowing combustion gases adapted to promote turbulence thereof, a bridge wall extending downwardly from said roof a relatively short distance and spaced from the upper portion of said stepped heat radiating wall to form a passageway through which hot products of combustion flow into a convection heating section formed by said bridge wall and positioned above said stepped heat radiating wall, and conduits in said convection heating section in communication with said conduits in said radiant heating chamber.

4. A furnace adapted for heating hydrocarbon fluids comprising a radiant heating chamber formed with side walls, a roof and a floor, means comprising a burner associated with the roof of said radiant heating chamber for burning fuel and supplying hot product of combustion thereto in a downward direction substantially centrally of said radiant heating chamber to generate radiant heat in said radiant heating chamber, conduits disposed along a wall of said radiant heating chamber for conveying hydrocarbon fluids to be heated, a stepped heat radiating wall extending at an angle from an intermediate point of an opposite wall of said radiant heating chamber to the floor thereof, said stepped heat radiating wall having a portion positioned beneath said burner in the path of the downflowing combustion gases adapted to promote turbulence thereof, a bridge wall extending downwardly from said roof a relatively short distance and spaced from the upper portion of said stepped heat radiating wall to form a passageway through which hot products of combustion flow into a convection heating section formed by said bridge wall and positioned above said stepped heat radiating wall, and conduits in said convection heating section in communication with said conduits in said radiant heating chamber.

5. A furnace adapted for heating hydrocarbon fluids comprising a radiant heating chamber formed with side walls, a roof and a floor, means comprising a burner associated with the roof of said radiant heating chamber for burning fuel and supplying hot products of combustion thereto in a downward direction to generate radiant heat in said radiant heating chamber, conduits disposed along a wall of said radiant heating chamber for conveying hydrocarbon fluids to be heated, an inclined wall extending downwardly from an intermediate point in the opposite wall of said radiant heating chamber to the floor and extending into the path of the downflowing combustion gases so as to promote turbulence thereof, and a passageway positioned above said inclined wall adapted for removing the products of combustion from an upper portion of said radiant heating chamber and from a point therein opposite to said conduits.

JOHN HERMAN RICKERMAN.